(12) United States Patent
Elshocht et al.

(10) Patent No.: US 7,849,494 B2
(45) Date of Patent: Dec. 7, 2010

(54) DIGITAL TELEVISION RECEIVER

(75) Inventors: Olivier Elshocht, Ixelles (BE); Joel Grad, Lincent (BE)

(73) Assignee: Sony Service Centre (Europe) N.V., Londerzeel (BE)

( * ) Notice: Subject to any disclaimer, the term of this patent is extended or adjusted under 35 U.S.C. 154(b) by 264 days.

(21) Appl. No.: 11/746,220

(22) Filed: May 9, 2007

(65) Prior Publication Data

US 2008/0282300 A1 Nov. 13, 2008

(51) Int. Cl.
*H04N 7/16* (2006.01)

(52) U.S. Cl. .................................. 725/152; 370/392.52

(58) Field of Classification Search .................... None
See application file for complete search history.

(56) References Cited

U.S. PATENT DOCUMENTS

| | | | | |
|---|---|---|---|---|
| 6,314,111 | B1 * | 11/2001 | Nandikonda et al. | 370/473 |
| 6,459,427 | B1 * | 10/2002 | Mao et al. | 725/109 |
| 2004/0181811 | A1 * | 9/2004 | Rakib | 725/122 |
| 2006/0265728 | A1 * | 11/2006 | Vare et al. | 725/81 |

* cited by examiner

*Primary Examiner*—Brian T Pendleton
*Assistant Examiner*—Cai Chen
(74) *Attorney, Agent, or Firm*—Oblon, Spivak, McClelland, Maier & Neustadt, L.L.P.

(57) ABSTRACT

A digital television receiver for use in a digital television broadcast system in which a plurality of digital television data streams can be provided in respective streams of television broadcast packets forming the lowest layer of a layered digital television structure and also in respective streams of Internet protocol packets forming the lowest layer of a layered Internet protocol structure, at least the streams of television broadcast packets being broadcast with a plurality of tables indicating where data of one layer of one structure can be found in another layer of one or other of the two structures, the received plurality of tables being used to determine where data contained in one layer can be found in an adjacent layer so as to construct tree structures or a new table allowing determination of in which stream of television broadcast packets the television data of a selected stream of Internet protocol packets is found. A two-stage process for identifying an alternative stream with television broadcast packets containing the same television programme is also proposed in which, first, identical transport streams are looked for and, second, the stream of Internet protocol packets containing the television programme are used to identify alternative streams of television broadcast packets containing the same television programme.

18 Claims, 4 Drawing Sheets

DIGITAL TELEVISION RECEIVER

BACKGROUND OF THE INVENTION

1. Field of the Invention

The present invention relates to a digital television receiver, a circuit for the receiver and methods relating thereto, in particular to a digital television device that is mobile and/or hand-held.

2. Description of the Related Art

Systems have been developed for broadcasting digital television. For instance, in Europe, various standards for digital television broadcast are used as part of the Digital Video Broadcast (DVB) system.

OBJECTS OF THE INVENTION

It is now proposed to provide improved standards providing digital television networks for use with mobile digital television receivers. Digital television standards, such as the DVB standard, broadcast the television data of television programmes within packets of data which are arranged in streams. Individual packets include programme identifiers (PIDs) for identifying transport stream packets belonging to a particular programme and allow the television data to be reconstructed. Various tables are broadcast with the streams of data. These tables provide information indicating the relationship between the various networks, transport streams and elementary streams. The networks are networks such as DVB networks which are not necessarily equivalent to television network. In particular, the network relates to a network operator rather than a broadcaster.

The same television data can be considered in the domain of the internet protocol (IP) world. The tables broadcast with the television data can include additional information mapping various layers and packets of data in the IP world to the packets and streams in the digital television world.

It is likely that a mobile digital television receiver moves out of the range of a particular transmitter such that it loses a particular elementary stream of data packets for a television service chosen by the user. It is proposed that the IP stream containing the television programme being received by the digital television device is used to identify what other elementary streams from other transport streams, possibly from other networks, are available containing the broadcast television programme required by the user. By making use of the various tables, it is possible to identify other elementary streams from other transport streams, possibly from other networks, which contain the data of the IP stream and, hence, the required television programme data such that the digital television receiver can retune to receive the new application data.

Unfortunately, the tables sent with the broadcast data do not include direct mappings to show where data of the IP streams can be found in corresponding elementary streams of the broadcast data. Hence, it can take undue processing and time for the digital television receiver to identify another elementary stream from another transport stream and possibly another network.

SUMMARY OF THE INVENTION

According to the present invention, there is provided a method of locating a stream of television broadcast packets for use in a digital television broadcast system in which a plurality of digital television data streams can be provided in 1) respective streams of television broadcast packets forming the lowest layer of a layered digital television structure and also in 2) respective streams of Internet protocol packets forming the lowest layer of a layered Internet protocol structure, at least the streams of television broadcast packets being broadcast with a plurality of tables indicating where data of one layer of one structure can be found in another layer of one or other of the two structures. The method includes receiving the plurality of tables; determining from the tables where the data contained in one layer can be found in an adjacent layer; constructing a data representation of the layered digital television structure as a television tree structure and of the layered Internet protocol structure as an Internet protocol tree structure; storing the television tree structure and the Internet protocol tree structure; and using the stored television tree structure and the stored Internet protocol tree structure to determine in which stream of television broadcast packets the television data of a selected stream of Internet protocol packets is found.

According to the present invention, there is also provided a circuit for a digital television receiver for use in a digital television broadcast system in which a plurality of digital television data streams can be provided in 1) respective streams of television broadcast packets forming the lowest layer of a layered digital television structure and also in 2) respective streams of Internet protocol packets forming the lowest layer of a layered Internet protocol structure, at least the streams of television broadcast packets being broadcast with a plurality of tables indicating where data of one layer of one structure can be found in another layer of one or other of the two structures. The circuit includes a demodulator for receiving the plurality of tables and a processor. The processor is configured to determine from the tables where the data contained in one layer can be found in an adjacent layer; construct a data representation of the layered digital television structure as a television tree structure and of the layered Internet protocol structure as an Internet protocol tree structure; and store the television tree structure and the Internet protocol tree structure. The processor is also configured to use the stored television tree structure and the stored Internet protocol tree structure to determine in which stream of television broadcast packets the television data of a selected stream of Internet protocol packets is found.

In this way, using the stored tree structures, it is possible immediately to identify where a selected piece of data can be found anywhere within the two worlds. Processing speed is thus increased. When a television receiver loses reception of a particular television programme contained in a stream of television broadcast packets, it is possible easily and quickly to identify another stream of television broadcast packets, possibly from a different transmitter or even a different television network, containing the same television programme.

In one arrangement, it is determined where the data contained in the lowest layer of the layered digital television structure can be found in the adjacent higher layer wherein the television tree structure represents the entire layered digital television structure and it is also determined where the data contained in the lowest layer of the layered Internet protocol structure can be found in the adjacent higher layer wherein the Internet protocol tree structure represents the entire layered Internet protocol structure.

This provides a complete mapping of the two worlds and allows direct mapping from the streams of Internet protocol packets to the streams of television broadcast packets.

Alternatively, in one arrangement, there is a construction of a data representation of the upper layers of the layered digital television structure as the television tree structure and of the upper layers of the layered Internet protocol structure as the Internet tree structure and use is made of at least one of the plurality of tables in conjunction with both the stored television tree structure and the Internet protocol tree structure so as to determine in which stream of television broadcast packets the television data of the selected stream of Internet protocol packets is found.

In this way, the bulk of the two tree structures are stored allowing quick and easy mapping from one world to the other, but the lowest layers of the tree structures representing the streams of television broadcast packets and streams of Internet protocol packets are determined as and when necessary. Because tables for these lowest layers are broadcast frequently and because the rest of the tree structure has already been determined and stored, it is still possible to map from the Internet protocol packets to the television broadcast packets quickly and efficiently. It is also noted that data at the lowest layer is subject to change more frequently and this approach ensures that the mapping is most up-to-date and accurate.

According to the present invention, there is also provided a method of locating a stream of television broadcast packets for use in a digital television broadcast system in which a plurality of digital television data streams can be provided in 1) respective streams of television broadcast packets forming the lowest layer of a layered digital television structure and also in 2) respective streams of Internet protocol packets forming the lowest layer of a layered Internet protocol structure, at least the streams of television broadcast packets being broadcast with a plurality of tables indicating where data of one layer of one structure can be found in another layer of one or other of the two structures. The method includes receiving the plurality of tables; determining from the tables where the data contained in one layer can be found in an adjacent layer; constructing a table indicating where, in the lowest layer of the layered digital television structure, data from the lowest layer of the layered Internet protocol structure is found; storing the constructed table; and using the constructed table to determine in which stream of television broadcast packets television data of a selected stream of Internet protocol packets is found.

According to the present invention, there is also provided a circuit for a digital television receiver for use in a digital television broadcast system in which a plurality of digital television data streams can be provided in 1) respective streams of television broadcast packets forming the lowest layer of a layered digital television structure and also in 2) respective streams of Internet protocol packets forming the lowest layer of a layered Internet protocol structure, at least the streams of television broadcast packets being broadcast with a plurality of tables indicating where data of one layer of one structure can be found in another layer of one or other of the two structures. The circuit includes a demodulator for receiving the plurality of tables; and a processor. The processor is configured to determine from the tables where the data contained in one layer can be found in an adjacent layer; construct a table indicating where, in the lowest layer of the layered digital television structure, data from the lowest layer of the layered Internet protocol structure is found; and store the construct table. The processor is also configured to use the constructed table to determine in which stream of television broadcast packets television data of a selected stream of Internet protocol packets is found.

In this way, only the lowest layers of the tree structures are stored. In effect, this provides a table mapping from the Internet protocol packets to the television broadcast packets. As a result, less data needs to be stored. Because, in general, it is only necessary to provide a mapping from the Internet protocol packets to the television broadcast packets, this arrangement achieves the same benefits as the arrangements discussed above.

Preferably, the layered digital television structure conforms to the Digital Video Broadcast standard.

Preferably, the plurality of tables include the INT, NIT, NIT_other, PAT, PMT tables.

Within a single DVB transport stream, the NIT, NIT_other and PAT tables are unique. There is one PMT table per television programme and one INT table per Internet protocol platform. Within a plurality of streams, all tables are multiple.

According to the present invention, there is also provided a method of locating a stream of television broadcast packets for use in a digital television broadcast system in which a plurality of digital data streams can be provided in 1) respective streams of television broadcast packets forming the lowest layer of a layered digital television structure, the layer of the layered television structure immediately above the lowest layer including a plurality of transport streams, each transport stream including one or more of said streams of television broadcast packets, and also in 2) respective streams of Internet protocol packets forming the lowest layer of a layered Internet protocol structure, at least the stream of television broadcast packets being broadcast with a plurality of tables indicating where data of one layer of one structure can be found in another layer of one or other of the two structures. The method includes comparing a first transport stream in which a selected stream of television broadcast packets are present with other transport streams in the layered digital television structure; judging if one of the other transport streams is identical to the first transport stream; concluding that said one of the other transport streams also contains the selected stream of television broadcast packets if said one of the other transport streams is identical to said first transport stream; and, if none of the other transport streams is judged to be identical to the first transport stream, determining from the plurality of tables and from the stream of Internet protocol packets containing the digital television data of the selected stream of television broadcast packets, in which other stream of television broadcast packets the television data of the selected stream of television broadcast packets is found.

According to the present invention, there is also provided a circuit for a digital television receiver for use in a digital television broadcast system in which a plurality of digital data streams can be provided in 1) respective streams of television broadcast packets forming the lowest layer of a layered digital television structure, the layer of the layered television structure immediately above the lowest layer including a plurality of transport streams, each transport stream including one or more of said streams of television broadcast packets, and also in 2) respective streams of Internet protocol packets forming the lowest layer of a layered Internet protocol structure, at least the stream of television broadcast packets being broadcast with a plurality of tables indicating where data of one layer of one structure can be found in another layer of one or other of the two structures. The circuit includes a processor configured to compare a first transport stream in which a selected stream of television broadcast packets are present with other transport streams in the layered digital television structure; judge if one of the other transport streams is identical to the first transport stream; conclude that said one of the other transport streams also contains the selected stream of television broadcast packets if said one of the other transport streams is identical to said first transport stream; and, if none of the other transport streams is judged to be identical to the first transport stream, determine from the plurality of tables and from the stream of Internet protocol packets containing the digital television data of the selected stream of television broadcast packets, in which other stream of television broadcast packets the television data of the selected stream of television broadcast packets is found.

In this way, when a television receiver loses reception of a particular stream of television broadcast packets containing a desired television programme, a two-stage process is used in order to find alternative television broadcast packets containing the same television programme. In many instances, referring to the next higher layer, namely that containing a transport stream, will result in identification of an alternative stream of television broadcast packets containing the same television programme. Only if this first stage fails does the arrangement refer to the stream of Internet protocol packets containing that television programme in order to identify an alternative stream of television broadcast packets containing the same television programme.

Preferably, the second stage makes use of the approaches discussed above in mapping from the IP world to the television broadcast world.

DETAILED DESCRIPTION OF THE PREFERRED EMBODIMENTS

The invention will be more clearly understood from the following description, given by way of example only, with reference to the accompanying drawings.

The following description is given in the context of DVB standards. However, it will be appreciated that the invention is equally applicable to other digital television standards where television data is broadcast in packets as part of a layered structure.

Figure 1:
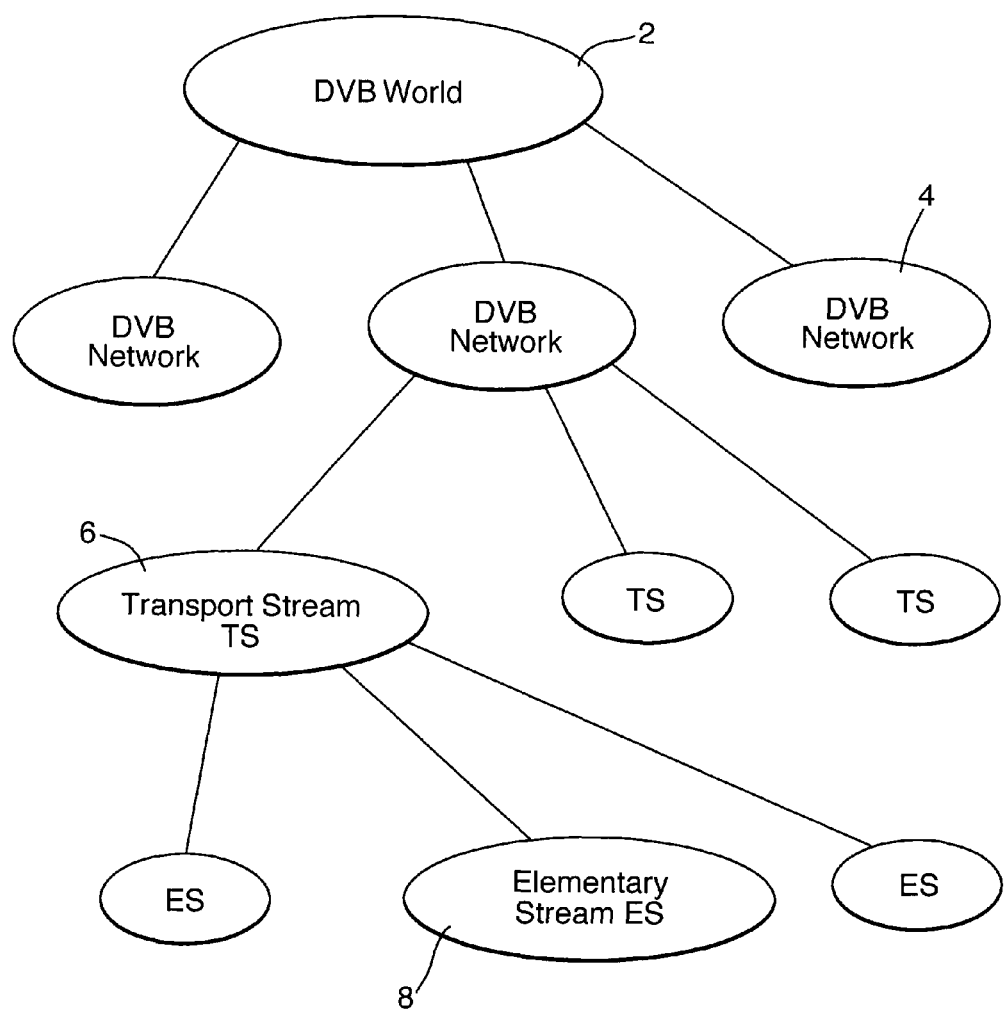
FIG. 1 illustrates schematically a layered digital television structure.

When digital television data is broadcast, it can be considered to be part of the DVB world as illustrated schematically in FIG. 1.

Within what can be considered as the DVB world 2, there are a plurality of different DVB networks 4. Each of these DVB networks may have their own service providers, physical transmitters, etc. Commercially, each DVB network may be completely independent, even though different DVB networks may have obtained rights to the same television material or programmes such that they broadcast those same television programmes, perhaps even at the same time.

Each DVB network will broadcast a plurality of transport streams 6 containing data for the end user receivers. Each transport stream will include a plurality of elementary streams 8 as illustrated including data for respective television programmes as well as other information such as service information and various data tables to be discussed further below.

Figure 2:
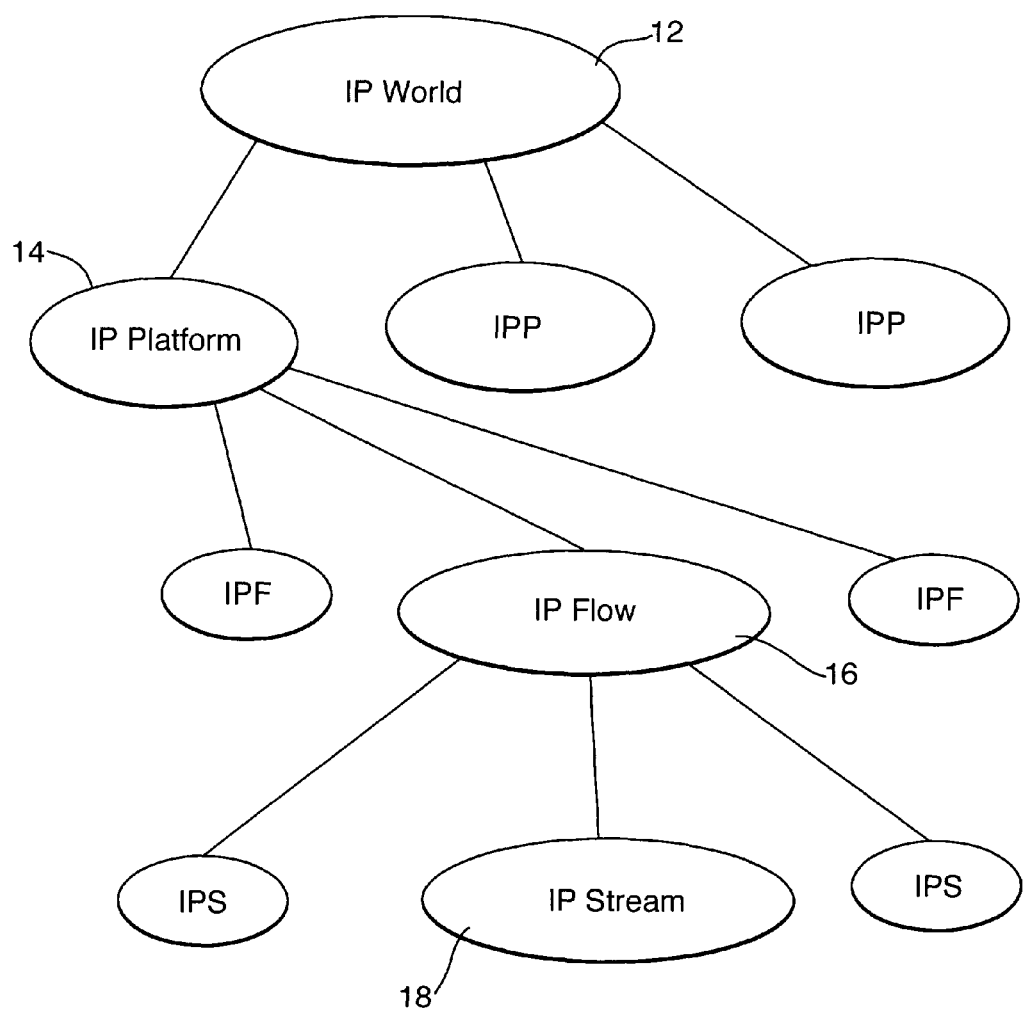
FIG. 2 illustrates schematically a layered Internet protocol structure.

The same television programmes can also be provided in the form of packets and streams suitable for the Internet and, hence, can be considered as part of the Internet protocol (IP) world as illustrated schematically in FIG. 2.

Within the IP world 12, a number of different IP platforms 14 exist. Each of these IP platforms is able to provide a plurality of IP flows 16, each of the IP flows including a plurality of IP streams 18.

Thus, the various IP streams will include the same television data as included in the various elementary streams 8 of the DVB world, but divided and arranged in different packets according to the IP world.

Programme identifiers (PID) tables are provided to enable a television receiver to identify the various data packets included in the elementary streams 8. In particular, each packet included in an elementary stream will have a packet identifier (PID). The PID will provide an indication of to what television programme a particular packet relates. Thus, for example, a digital television receiver can identify all of the packets it needs to reconstruct a particular television programme.

As mentioned above, the transport streams 6 of the DVB world 2 include various SI/PSI tables, in particular INT, NIT, NIT_other, PAT and PMT tables.

These tables provide what might be considered as various views of the DVB world 2 and IP world 12. In particular, they provide information as to how data in one level of the layered structures of the DVB world 2 and IP world 12 maps into a different level, perhaps of a different world 2, 12. Details of the particular tables are well known and can be found in the relevant standards documents.

Thus, for instance, from the tables, it is possible to determine from which DVB network 4 the data contained in a particular elementary stream 8 is derived.

Unfortunately, the various tables only provide particular views or mappings between the various levels of the two layered worlds. The present application now proposes that the digital television receiver should construct, from the various tables, data representing the entire layered tree structure of the DVB world and the entire layered tree structure of the IP world and store this data in memory. This allows the digital television receiver to be able immediately to determine where data from a particular level in one world can be found in any arbitrary level in that same world or the other world. The broadcast tables include overlapping views or mappings of the location of data such that there is repetition of information. It therefore requires less memory to store the constructed tree structures and to store all of the available tables.

By virtue of the tables and their various mappings, it is of course possible to determine where television data of one level of one world is found in another arbitrary level of one of the worlds as and when necessary. However, this may require the use of two or more tables to provide mappings to intermediate levels before finding where the data is found in the desired arbitrary level. Having to cross-refer between several tables will take extra processing and extra time. Also, some of the tables, such as the INT and NIT tables are broadcast at relatively infrequent intervals, thereby introducing further delays in the required mapping.

Figure 3:
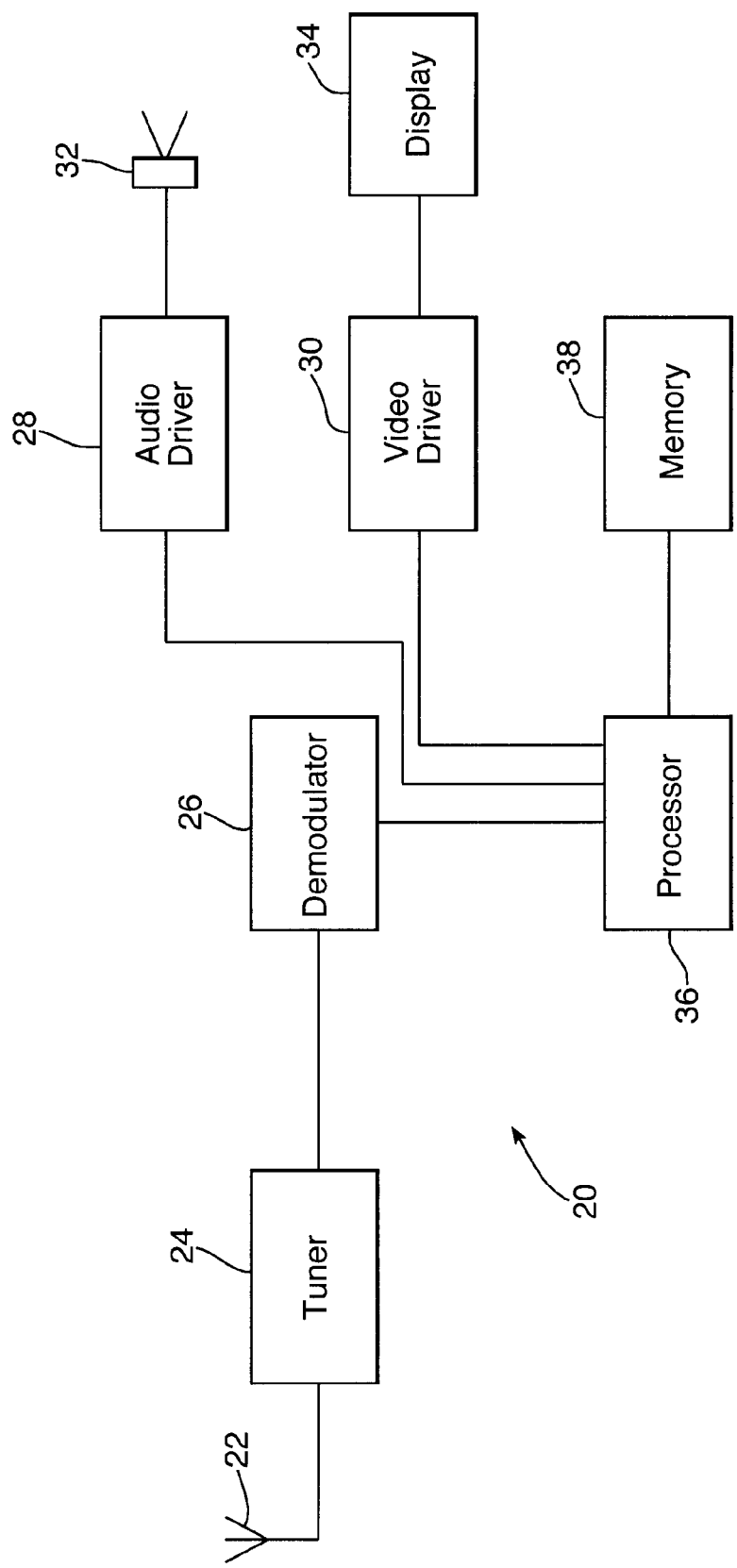
FIG. 3 illustrates schematically features of a digital television receiver.

FIG. 3 illustrates schematically an example of a digital television receiver. The digital television receiver 20 includes an aerial 22 for receiving broadcast digital television signals and a tuner 24 for tuning to desired radio frequencies. Presented merely schematically, the demodulator 26 obtains the various transport streams 6 and elementary streams 8 as required. For instance, by means of the PID tables, the demodulator 26 is able to identify the appropriate audio packets for a particular television programme and provide the audio data to the audio driver 28 for example via a processor 36. Similarly, it identifies the appropriate video packets and provides the video data to the video driver 30. One or more loudspeakers 32 and a display 34 are provided for reproducing the desired television programme.

The demodulator 26 can also be used to obtain the SI/PSI tables discussed above. From these tables, the processor 36 is able to construct a data representation of the complete tree structure illustrated in FIG. 1 as well as the complete tree structure as illustrated in FIG. 2. These tree structures, or at least data representations of them, are then stored in the memory 38 for future use by the digital receiver 20. Thus, whenever the digital receiver needs to know where, in another level of one of the worlds, television data from a particular part of one of the worlds can also be found, reference can be made immediately to the tree structures stored in memory 38 to find the appropriate mapping. It is not necessary to wait for tables to be received in the broadcast stream or to work through several of the tables mapping one to the next.

It is also possible for the processor 36 to construct and store in memory 38 only the upper levels of the tree structures as illustrated in FIGS. 1 and 2 so as to provide only a partial representation. The lowermost levels, ie containing the elementary streams and the IP streams, are most likely to change over time, thereby rendering a complete representation inaccurate. Also, it is possible to calculate the lowest level very quickly with the upper partial representation already stored. Tables such as the INT and NIT tables are broadcast relatively infrequently. Provided that it is not necessary to refer to these tables, construction of the lowest level, or at least mapping from the lowest level, can be achieved very quickly.

Figure 4:
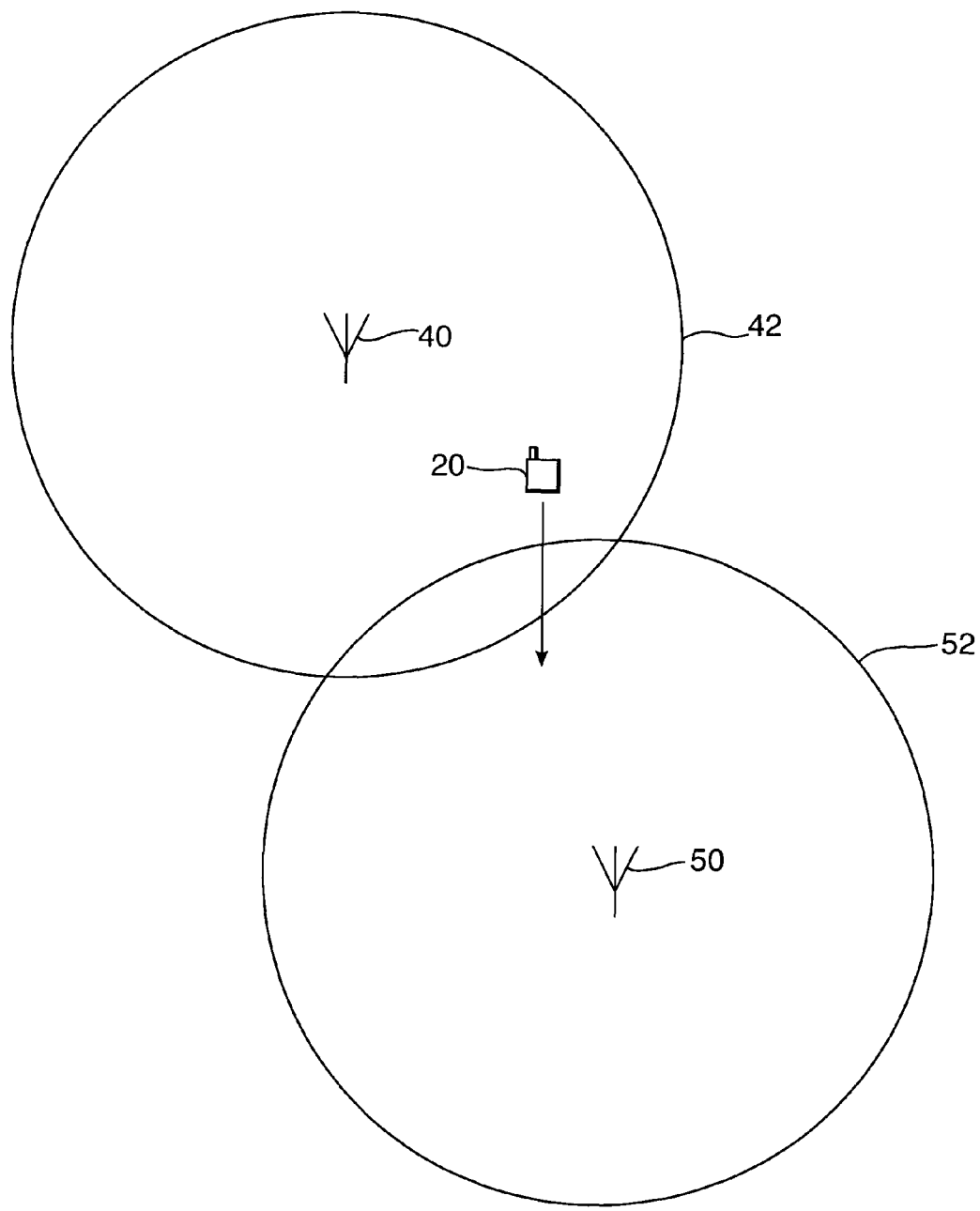
FIG. 4 illustrates a digital television receiver moving between transmitter ranges.

FIG. 4 illustrates a digital television receiver 20 moving from within the broadcast range 42 of a transmitter 40 of a first network into the broadcast range 52 of a transmitter 50 of a second network. There exists the problem that a user, watching a particular television programme, will lose reproduction of that television programme as the digital television receiver 20 moves out of the broadcast range 42 of the first network. It is quite possible that the second network is broadcasting the same television programme such that that same television programme would be available from the signal broadcast by the transmitter 50. However, the digital television receiver 20 receiving an elementary stream 8 containing a television programme from the first network will normally not have any knowledge of which elementary streams from the second network might contain that same television programme.

It is proposed to use the SI/PSI tables to work back from the elementary stream being received for a particular television programme to determine the equivalent IP stream 18 in the IP world 12. It is then similarly possible to use the SI/PSI tables to determine in which elementary streams 8 of all the DVB networks 4 that same television data is present. In this way, when the digital television receiver 20 of FIG. 4 moves out of range of the transmitter 40, the receiver 20 can receive and interpret the various tables to determine in which elementary streams transmitted by the transmitter 50 the same television programme can be found.

By means of the present invention as described above whereby the tree structures of the DVB world and IP world are stored in advance in the memory 38, this process is made much quicker and more efficient. The receiver 20 does not have to await reception of the various tables or carry out the various mappings from table to table. Furthermore, it should be noted that it is not ideal for the digital television receiver 20 to be attempting to receive the various SI/PSI tables when it is moving out of range of the transmitter 40 of the first network. By virtue of the present invention, reception of these tables is achieved while the receiver 20 is still in a position of good reception of signals from the transmitter 40.

For this particular situation where the digital television receiver 20 desires to know in which other elementary streams 8 (of other transport streams 6 and/or networks 4) data for the same television programme can be found, it is not necessary to store in memory 38 the entire tree structures for the DVB world and IP world. Instead, it is possible merely to store a table representing mappings between the lower levels of the two worlds, perhaps only between the IP streams 18 and the elementary streams 8.

Thus, there are several options for storing the data in memory, for instance, 1) storing the full DVB and IP trees in memory, 2) storing both trees, but with the exception of the lowest level since the tables containing the information that would be stored there can be retrieved quickly from the broadcast data and 3) not using the two tree data structures at all, but one single table data structure that maps the lowest level of IP tree to the lowest level of the DVB tree.

For the third option, each element of the lowest level contains a copy of the information that would be contained in the upper levels in tree data structure. It is a different data structure, but containing the same information as the first option.

The first and third options create their own difficulties since, as described above, the lowest levels are most likely to change, and it will therefore be required to continuously monitor SI/PSI tables to keep the stored information up-to-date. This may be more difficult to do with the case C data structure than with the case A.

Thus, if the digital television receiver 20 loses the signal for the elementary stream 8 containing a particular television programme, it can use the IP stream 18 containing that television programme to identify other elementary streams 8 of other transport streams 6 and/or networks 4, in which the same television programme can be found.

The elementary stream does not contain an identification of the IP stream, but, in digital television systems such as DVB-H, TV programmes are selected by choosing a specific IP flow, not by choosing an elementary stream. For example, the software retrieves the Electronic Programme Guide, which contains a list of TV programmes, each of them associated to a specific IP flow. When the user chooses a TV programme, that user actually selects a specific IP flow. The software is then responsible to find an IP stream and the associated elementary stream that transports that IP flow and therefore the selected TV programme. In case of handover, the software just needs to find another IP stream and elementary stream for the same IP flow that the user had already selected. The user does not choose a TV programme by selecting a specific elementary stream.

An alternative approach to finding equivalent elementary streams in other transport streams is merely to look for an identical transport stream. Within a particular network, a number of different transmitters may be provided with adjacent transmitters providing the same transport stream on different frequencies. Hence, when the digital television receiver 20 loses the signal for an elementary stream, it is possible merely to look for an identical transport stream. This might even be present on a different network. Hence, the required elementary stream can be found within that identical transport stream.

The NIT table broadcast with each transport stream describes all the transport streams of the network it is part of. For each transport stream, the table lists its original_network_id and transport_stream_id. This information is stored in the elements of the DVB tree. The DVB specifications state that two transport streams, of the same network or not, are identical if they have the same original_network_id and transport_stream_id.

To find an identical transport stream to handover to, the receiver iterates through all transport streams in the DVB tree until it finds one with the same original_netowkr_id and transport_stream_id as the one currently being received.

According to the present invention, it is proposed to apply a two-step approach whereby the digital television receiver 20 first looks for an identical transport stream as discussed above and then, if this fails to identify an elementary stream, makes use of the equivalent IP stream to identify other equivalent elementary streams. The second step can use only the SI/PSI tables and the intermediate mappings discussed above but, of course, preferably makes use of the previously determined and stored tree structures or direct mapping tables in the memory 38.

We claim:

1. A circuit for a digital television receiver for use in a digital television broadcast system in which a plurality of digital television data streams are provided in respective streams of television broadcast packets forming a lowest layer of a layered digital television structure and respective streams of Internet protocol packets forming a lowest layer of a layered Internet protocol structure, at least the streams of television broadcast packets being broadcast with a plurality of tables, the tables indicating where data of one layer of one structure can be found in another layer of one or other of the two structures, the circuit including:
    a demodulator configured to receive the plurality of tables; and
    a processor configured to construct, from the tables, mappings of where the data included in layers can be found in adjacent layers; configured to construct, from the mappings, a data tree structure including a television tree structure and including an Internet protocol tree structure, the television tree structure representing the layered digital television structure and the Internet protocol tree structure representing the layered Internet protocol structure; configured to store the data tree structure; and configured to use the stored data tree structure to directly map television broadcast packets to data streams of the plurality of digital television data streams, and to determine directly in which one of the streams of the television broadcast packets the television data of a selected stream of Internet protocol packets is found.

2. The circuit according to claim 1, wherein the processor is further configured to:
    determine where the data included in the lowest layer of the layered digital television structure can be found in an adjacent higher layer wherein the television tree structure represents the entire layered digital television structure, and to determine where the data included in a lowest layer of the layered Internet protocol structure can be found in an adjacent higher layer,
    wherein the Internet protocol tree structure represents the entire layered Internet protocol structure.

3. The circuit according to claim 1 wherein the processor is further configured to:
    construct a data representation of upper layers of the layered digital television structure as the television tree structure and construct a data representation of upper layers of the layered Internet protocol structure as the Internet tree structure; and when using the stored television tree structure, to processor is configured to use at least one of the plurality of tables in conjunction with both the stored television tree structure and the Internet protocol tree structure so as to determine in which stream of television broadcast packets the television data of the selected stream of Internet protocol packets is found.

4. The circuit according to claim 1 wherein the layered digital television structure conforms to the Digital Video Broadcast standard.

5. The circuit according to claim 1 wherein the plurality of tables include the INT, NIT, NIT_other, PAT and PMT tables.

6. A circuit for a digital television receiver for use in a digital television broadcast system in which a plurality of digital television data streams are provided in respective streams of television broadcast packets forming a lowest layer of a layered digital television structure and in respective streams of Internet protocol packets forming a lowest layer of a layered Internet protocol structure, at least the streams of television broadcast packets being broadcast with a plurality of tables, the tables indicating where data of one layer of one structure can be found in another layer of one or other of the two structures, the circuit including:
    a demodulator configured to receive the plurality of tables; and
    a processor configured to construct, from the tables, mappings of where the data included in layers can be found in adjacent layers; configured to construct, from the mappings, a table indicating where, in a lowest layer of the layered digital television structure, data from a lowest layer of the layered Internet protocol structure is found; configured to store the constructed table; and configured to use the constructed table to determine directly in which one of the streams of television broadcast packets television data of a selected stream of Internet protocol packets is found.

7. The circuit according to claim 6 wherein the layered digital television structure conforms to the Digital Video Broadcast standard.

8. The circuit according to claim 6 wherein the plurality of tables include the INT, NIT, NIT_other, PAT and PMT tables.

9. A method of locating a stream of television broadcast packets for use in a digital television broadcast system in which a plurality of digital television data streams are provided in respective streams of television broadcast packets forming a lowest layer of a layered digital television structure and in respective streams of Internet protocol packets forming a lowest layer of a layered Internet protocol structure, at least the streams of television broadcast packets being broadcast with a plurality of tables, the tables indicating where data of one layer of one structure can be found in another layer of one or other of the two structures, the method including:
    receiving the plurality of tables at a demodulator;
    constructing, by a processor from the tables, mappings of where the data included in layers can be found in adjacent layers;
    constructing a data tree structure including a television tree structure and including an Internet protocol tree structure, the television tree structure representing the layered digital television structure and the Internet protocol tree structure representing the layered Internet protocol structure;
    storing the data tree structure in a memory; and
    using the stored data tree structure to directly map television broadcast packets to data streams of the plurality of digital television data streams, to directly determine in which one of the data streams of television broadcast packets the television data of a selected stream of Internet protocol packets is found.

10. The method according to claim 9 wherein the step of determining further includes:

determining where the data included in a lowest layer of the layered digital television structure can be found in an adjacent higher layer, the television tree structure representing the entire layered digital television structure; and determining where the data included in a lowest layer of the layered Internet protocol structure can be found in an adjacent higher layer, the Internet protocol tree structure representing the entire layered Internet protocol structure.

11. The method according to claim 9 wherein the step of constructing includes:

constructing a data representation of upper layers of the layered digital television structure as the television tree structure, and of upper layers of the layered Internet protocol structure as the Internet tree structure; and the step of using further includes, using at least one of the plurality of tables in conjunction with both the stored television tree structure and the Internet protocol tree structure so as to determine in which stream of television broadcast packets the television data of the selected stream of Internet protocol packets is found.

12. The method according to claim 9 wherein the layered digital television structure conforms to the Digital Video Broadcast standard.

13. The method according to claim 9 wherein the plurality of tables include the INT, NIT, NIT_other, PAT and PMT tables.

14. A method of locating a stream of television broadcast packets for use in a digital television broadcast system in which a plurality of digital television data streams are provided in respective streams of television broadcast packets forming a lowest layer of a layered digital television structure and in respective streams of Internet protocol packets forming a lowest layer of a layered Internet protocol structure, at least the streams of television broadcast packets being broadcast with a plurality of tables, the tables indicating where data of one layer of one structure can be found in another layer of one or other of the two structures, the method including:

receiving the plurality of tables at a demodulator;

constructing by a processor from the tables, mappings of where the data included in layers can be found in adjacent layers;

constructing a table from the mappings, the tables indicating where, in a lowest layer of the layered digital television structure, data from a lowest layer of the layered Internet protocol structure is found;

storing the constructed table in a memory; and using the constructed table to determine directly in which one of the data streams of television broadcast packets television data of a selected stream of Internet protocol packets is found.

15. The method according to claim 14 wherein the layered digital television structure conforms to the Digital Video Broadcast standard.

16. The method according to claim 14 wherein the plurality of tables include the INT, NIT, NIT_other, PAT and PMT tables.

17. A non-transient computer readable medium having program code means stored on the computer readable medium for performing the method of claim 9 when said program code means is run on a computer.

18. A non-transient computer readable medium having program code means stored on the computer readable medium for performing the method of claim 14 when said program code means is run on a computer.

* * * * *

UNITED STATES PATENT AND TRADEMARK OFFICE
CERTIFICATE OF CORRECTION

| | | |
|---|---|---|
| PATENT NO. | : 7,849,494 B2 | Page 1 of 1 |
| APPLICATION NO. | : 11/746220 | |
| DATED | : December 7, 2010 | |
| INVENTOR(S) | : Olivier Elshocht et al. | |

It is certified that error appears in the above-identified patent and that said Letters Patent is hereby corrected as shown below:

On the title page, Item (73), the Assignee's name is incorrect. Item (73) should read:

Item -- (73) Assignee: Sony Europe Limited, Surrey (UK) --

Signed and Sealed this
Seventeenth Day of May, 2011

David J. Kappos
*Director of the United States Patent and Trademark Office*